(12) United States Patent
Uno

(10) Patent No.: US 8,630,105 B2
(45) Date of Patent: Jan. 14, 2014

(54) SWITCHING POWER SUPPLY APPARATUS INCLUDING A PFC CONVERTER THAT SUPPRESSES HARMONIC CURRENTS

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/235,571

(22) Filed: Sep. 19, 2011

(65) Prior Publication Data

US 2012/0236612 A1  Sep. 20, 2012

Related U.S. Application Data

(63) Continuation of application No. PCT/JP2009/065910, filed on Sep. 11, 2009.

(30) Foreign Application Priority Data

Mar. 24, 2009  (JP) ................................. 2009-071161

(51) Int. Cl.
*H02M 5/45* (2006.01)
*H02M 5/451* (2006.01)

(52) U.S. Cl.
USPC .............................. 363/89; 363/125; 323/299

(58) Field of Classification Search
USPC ........ 323/290, 299, 351, 266; 363/44, 48, 65, 363/81, 82, 86, 89, 90, 125–127
See application file for complete search history.

(56) References Cited

U.S. PATENT DOCUMENTS

| | | | |
|---|---|---|---|
| 5,742,151 A * | 4/1998 | Hwang ........................... | 323/222 |
| 5,757,635 A * | 5/1998 | Seong ............................. | 363/89 |
| 5,804,950 A * | 9/1998 | Hwang et al. .................. | 323/222 |
| 5,818,707 A * | 10/1998 | Seong et al. .................... | 363/89 |
| 5,867,379 A * | 2/1999 | Maksimovic et al. .......... | 363/89 |
| 6,175,218 B1 * | 1/2001 | Choi et al. ..................... | 323/222 |

(Continued)

FOREIGN PATENT DOCUMENTS

| | | |
|---|---|---|
| CN | 101080864 A | 11/2007 |
| EP | 1 317 052 A2 | 6/2003 |

(Continued)

OTHER PUBLICATIONS

Official Communication issued in International Patent Application No. PCT/JP2009/065910, mailed on Nov. 2, 2009.

(Continued)

*Primary Examiner* — Adolf Berhane
*Assistant Examiner* — Nusrat Quddus
(74) *Attorney, Agent, or Firm* — Keating & Bennett, LLP

(57) ABSTRACT

In a switching power supply apparatus, an alternating-current input power supply is input to the input terminals of a power factor correction converter and a DC-DC converter is connected to output terminals. A load is connected to the output of the DC-DC converter. A digital signal processing circuit takes the product of an output voltage error and a detection value of the input voltage as a current reference amplitude value and controls the on period of a switching element in accordance with the difference between the current reference amplitude value and the current flowing through an inductor. The target value of the output voltage or the output voltage error is corrected using a value that is proportional to the current reference amplitude value such that the output voltage rises as the load goes from a light to a heavy load state.

4 Claims, 12 Drawing Sheets

(56) References Cited

U.S. PATENT DOCUMENTS

| | | | |
|---|---|---|---|
| 6,259,613 B1 * | 7/2001 | Lee et al. | 363/89 |
| 6,388,429 B1 * | 5/2002 | Mao | 323/222 |
| 6,469,917 B1 * | 10/2002 | Ben-Yaakov | 363/44 |
| 6,753,798 B2 * | 6/2004 | Feldtkeller | 341/143 |
| 6,882,551 B2 * | 4/2005 | Shimada et al. | 363/79 |
| 6,980,445 B2 * | 12/2005 | Fukumoto et al. | 363/45 |
| 7,148,664 B2 * | 12/2006 | Takahashi et al. | 323/222 |
| 7,359,224 B2 * | 4/2008 | Li | 363/89 |
| 7,538,525 B2 * | 5/2009 | Kim et al. | 323/205 |
| 7,772,811 B1 * | 8/2010 | Jain et al. | 323/224 |
| 7,919,950 B2 * | 4/2011 | Uno et al. | 323/207 |
| 8,076,919 B2 * | 12/2011 | Liu et al. | 323/285 |
| 8,179,703 B2 * | 5/2012 | Uno | 363/44 |
| 8,228,696 B2 * | 7/2012 | Uno | 363/89 |
| 8,232,780 B2 * | 7/2012 | Uno | 323/222 |
| 2002/0011825 A1 | 1/2002 | Usui | |
| 2004/0178784 A1 * | 9/2004 | Okamoto | 323/283 |
| 2005/0128773 A1 | 6/2005 | Yang et al. | |
| 2007/0103947 A1 * | 5/2007 | Taguchi et al. | 363/45 |
| 2007/0145956 A1 | 6/2007 | Takeuchi | |
| 2008/0130336 A1 * | 6/2008 | Taguchi | 363/125 |
| 2008/0225558 A1 * | 9/2008 | Gordon | 363/21.15 |
| 2010/0091523 A1 * | 4/2010 | Uno et al. | 363/20 |
| 2011/0216558 A1 * | 9/2011 | Uno | 363/21.12 |
| 2011/0222318 A1 * | 9/2011 | Uno et al. | 363/21.05 |
| 2012/0057382 A1 * | 3/2012 | Uno | 363/89 |
| 2012/0155132 A1 * | 6/2012 | Uno | 363/80 |

FOREIGN PATENT DOCUMENTS

| | | |
|---|---|---|
| EP | 1 826 896 A1 | 8/2007 |
| JP | 11-308857 A | 11/1999 |
| JP | 2001-119956 A | 4/2001 |
| JP | 2001-231259 A | 8/2001 |
| JP | 2001-268897 A | 9/2001 |
| JP | 2002-191768 A | 7/2002 |
| JP | 2002-218760 A | 8/2002 |
| JP | 2003-169478 A | 6/2003 |
| JP | 2004-194412 A | 7/2004 |
| JP | 2004-194425 A | 7/2004 |
| JP | 2006-187159 A | 7/2006 |
| JP | 2007-514395 A | 5/2007 |
| JP | 2007-151208 A | 6/2007 |
| JP | 2007-181362 A | 7/2007 |
| JP | 2008-182831 A | 8/2008 |

OTHER PUBLICATIONS

Uno; "Power Factor Correction Converter"; U.S. Appl. No. 13/233,083, filed Sep. 15, 2011.

* cited by examiner

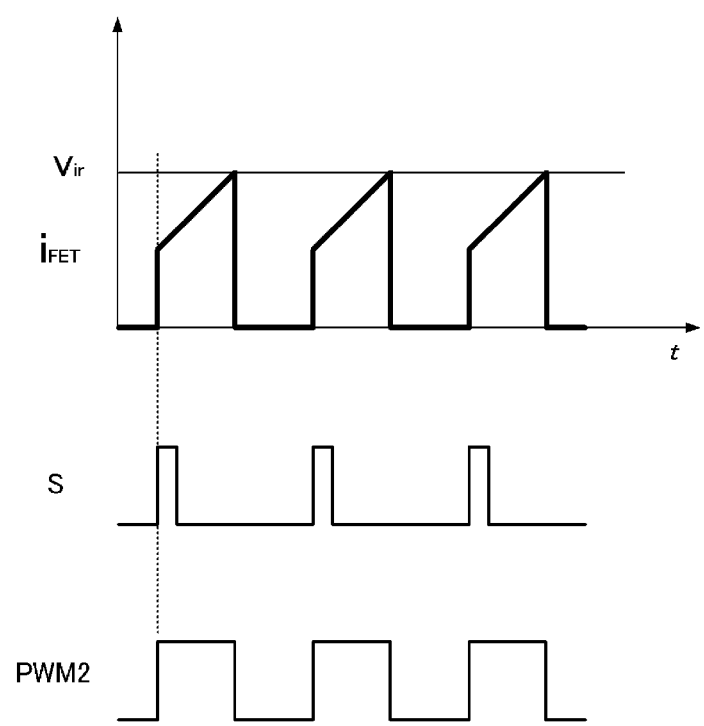

SWITCHING POWER SUPPLY APPARATUS INCLUDING A PFC CONVERTER THAT SUPPRESSES HARMONIC CURRENTS

BACKGROUND OF THE INVENTION

1. Field of the Invention

The present invention relates to a power supply apparatus to which an alternating-current power supply is input and from which a direct-current voltage is output, and in particular, the present invention relates to a switching power supply apparatus equipped with a PFC converter that suppresses harmonic currents.

2. Description of the Related Art

There are regulations concerning harmonic currents, with respect to the power capacity of electrical appliances connected to a commercial power supply, and switching power supply apparatuses to which a commercial power supply is input are often equipped with a power factor correction (PFC) converter in order to comply with such regulations.

A general switching power supply apparatus, which receives a commercial alternating-current power supply as an input power supply, rectifies and smoothes the commercial alternating-current power supply, thereby converting the commercial alternating-current power supply into a direct-current voltage, and since the direct-current voltage is then subjected to switching by a DC-DC converter, the input current becomes discontinuous and significantly distorted from a sine wave. This is a cause of the generation of harmonic currents.

Consequently, in order to suppress such harmonic currents, a PFC converter is provided next to a full-wave rectifying circuit and upstream from a smoothing circuit based on a smoothing capacitor.

The PFC converter is defined by a chopper circuit and operates such that the waveform of the input current has the shape of a sine wave having the same phase as and a similar shape to the waveform of the input voltage. Accordingly, harmonic currents are suppressed to a certain level or less and the power factor is also improved.

Since such a PFC converter is a type of boost converter, the conversion efficiency of the PFC converter itself affects the power conversion efficiency of the power supply apparatus as a whole. If the output voltage of the
PFC converter is insufficiently boosted, the power conversion efficiency decreases.

Independent of a downstream DC-DC converter circuit and the load state of the downstream DC-DC converter circuit, if the output voltage of the PFC converter (that is, the input voltage of the downstream DC-DC converter) is controlled so as to be constant, in the case of a light load, an excessively high input voltage is applied to the downstream DC-DC converter and the power conversion efficiency of the downstream DC-DC converter is decreased.

Japanese Unexamined Patent Application Publication No. 2001-268897 and Japanese Unexamined Patent Application Publication No. 2007-181362 disclose conventional techniques used to prevent this problem. A power supply apparatus disclosed in Japanese Unexamined Patent Application Publication No. 2001-268897 performs control such that a PFC converter outputs a voltage that is greater than a peak value of the input voltage by a certain amount.

A power supply apparatus disclosed in Japanese Unexamined Patent Application Publication No. 2007-181362 stops operation of a PFC converter when the load is light in accordance with feedback from the load.

Here, the configuration of a switching power supply apparatus described in Japanese Unexamined Patent Application Publication No. 2007-181362 will be described with reference to FIG. 1. The switching power supply apparatus illustrated in FIG. 1 includes a rectifier 2 that coverts an alternating-current input voltage 1 having a wide range into a direct-current voltage, a boost-type power converter 3a that supplies this rectified output to a DC-DC converter 4a, a PFC control circuit 42a that controls the PFC converter, a load detection circuit 41 that detects the state of a load, an output voltage controller 43 that controls an output voltage, and a PFC on/off circuit 44 that switches the PFC control circuit between operating and being stopped.

The PFC on/off circuit 44 compares a detection output value of the load detection circuit 41 and a determination reference value used for determining the state of the load and the PFC control circuit 42a causes the PFC converter to operate or stop on the basis of the result of the comparison.

However, with the power supply apparatus disclosed in Japanese Unexamined Patent Application Publication No. 2001-268897, there is a problem in that the output voltage of the PFC converter is determined based on only the input voltage, which is not related to the load. With the power supply apparatus disclosed in Japanese Unexamined Patent Application Publication No. 2007-181362, there is a problem in that a dedicated circuit for detecting and feeding back the weight of the load is required.

SUMMARY OF THE INVENTION

To overcome the problems described above, preferred embodiments of the present invention provide a switching power supply apparatus that, without obtaining feedback from the load, automatically and continuously controls the output voltage of the PFC converter to an optimum value in accordance with the weight of the load.

A switching power supply apparatus according to a preferred embodiment of the present invention preferably includes a PFC converter including a rectifying circuit that rectifies an alternating-current voltage input from an alternating-current input power supply, a series circuit that is connected next to the rectifying circuit and includes an inductor and a switching element, a rectifying smoothing circuit that is connected in parallel with the switching element, and a switching controller arranged to control the switching element such that an input current input from the alternating-current input power supply has a similar shape to the alternating-current voltage, and an isolated DC-DC converter that is connected next to the PFC converter and includes a transformer that includes at least a primary coil and a second coil, a primary-side circuit that is connected to the primary coil and a second-side circuit that is connected to the second coil and outputs a power supply voltage to a load.

The switching power supply apparatus preferably further includes an input voltage detector arranged to detect an input voltage input from the alternating-current input power supply, a current detector arranged to detect a current flowing through the inductor or a current flowing through the switching element, and an output voltage detector arranged to detect an output voltage of the rectifying smoothing circuit. The switching control circuit preferably takes a product of an output voltage error, which is an error of a detection value of the output voltage with respect to a target value of the output voltage, and a detection value of the input voltage as a current reference amplitude value and controls an on period of the switching element in accordance with a difference between the current reference amplitude value and the current detected by the current detector.

The switching power supply apparatus preferably further includes an output voltage control value corrector arranged to correct the target value of the output voltage or the output voltage error by using a value that is proportional to the current reference amplitude value such that the output voltage rises as the load goes from a light load state to a heavy load state.

A switching power supply apparatus according to another preferred embodiment of the present invention preferably includes a PFC converter including a rectifying circuit that rectifies an alternating-current voltage input from an alternating-current input power supply, a series circuit that is connected next to the rectifying circuit and includes an inductor and a switching element, a rectifying smoothing circuit that is connected in parallel with the switching element, and a switching controller arranged to control the switching element such that an input current input from the alternating-current input power supply comes to have a similar shape to the alternating-current voltage, and an isolated DC-DC converter that is connected next to the PFC converter and includes a transformer that includes at least a primary coil and a second coil, a primary-side circuit that is connected to the primary coil, and a second-side circuit that is connected to the second coil and outputs a power supply voltage to a load.

The switching power supply apparatus preferably further includes an input voltage detector arranged to detect an input voltage input from the alternating-current input power supply, a current detector arranged to detect a current flowing through the inductor or a current flowing through the switching element, and an output voltage detector arranged to detect an output voltage of the rectifying smoothing circuit. The switching control circuit preferably takes a product of an output voltage error, which is an error of a detection value of the output voltage with respect to a target value of the output voltage, and a detection value of the input voltage as a current reference amplitude value and switches the switching element off when the current detected by the current detector has reached the current reference amplitude value.

The switching power supply apparatus preferably further includes an output voltage control value corrector arranged to correct the target value of the output voltage or the output voltage error by using a root-mean-square value or an average value of the current detected by the current detector and a value that is proportional to the current reference amplitude value such that the output voltage rises as the load goes from a light load state to a heavy load state.

The switching controller and the output voltage control value corrector are preferably defined by a digital signal processor (DSP) that holds a digital value that corresponds to the target value of the output voltage and the output voltage control value corrector corrects the digital value by using a value that is proportional to the current reference amplitude value.

According to preferred embodiments of the present invention, the output voltage values of a PFC converter are respectively set to optimal values in accordance with the weight of the load and the power conversion efficiency of a downstream DC-DC converter can be optimized in accordance with the state of the load and as a result the power conversion efficiency of the AC-DC converter as a whole can be increased.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 shows voltage and current waveform diagrams of individual components of FIG. 13.

DETAILED DESCRIPTION OF THE PREFERRED EMBODIMENTS

First Preferred Embodiment

A switching power supply apparatus 201 according to a first preferred embodiment of the present invention will be described with reference to FIGS. 2 to 7.

Figure 1:
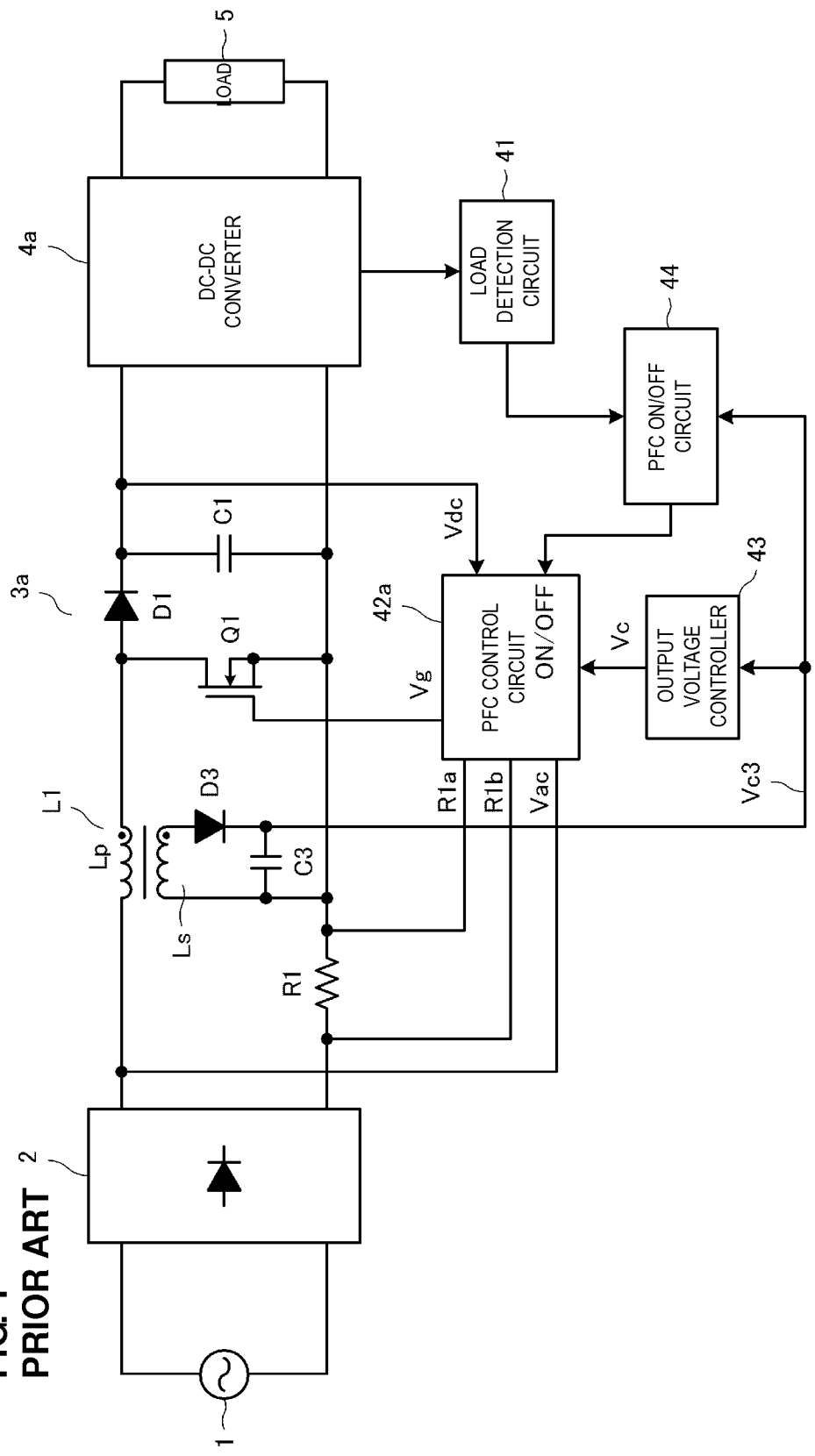
FIG. 1 is a diagram illustrating the configuration of a known switching power supply apparatus.
Figure 2:
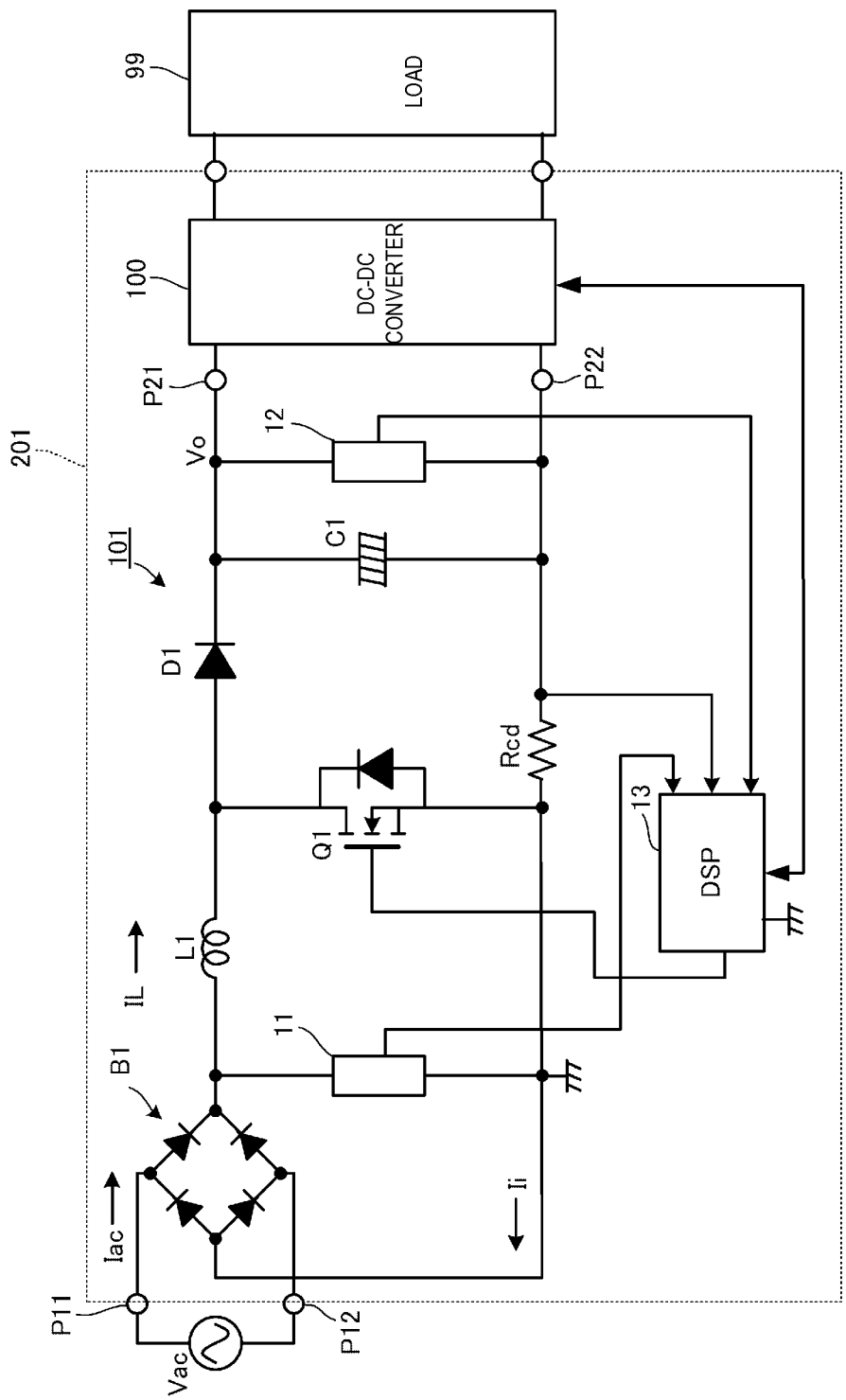
FIG. 2 is a circuit diagram of a switching power supply apparatus according to a first preferred embodiment of the present invention.

FIG. 2 is a circuit diagram of the switching power supply apparatus 201 according to the first preferred embodiment. In FIG. 2, symbols P11 and P12 denote input terminals of a PFC converter 101 and symbols P21 and P22 denote output terminals of the PFC converter 101. An alternating-current input power supply Vac, which is a commercial alternating-current power supply, is input to the input terminals P11 and P12 and a DC-DC converter 100 is connected to the output terminals P21 and P22.

Preferably, the DC-DC converter 100 is an isolated DC-DC converter and includes a transformer including at least a primary coil and a second coil, a primary-side circuit that is connected to the primary coil and a second-side circuit that is connected to the second coil and that outputs a power supply voltage to a load.

A load 99 is connected to the output of the DC-DC converter 100 and a direct-current voltage, which has been stabilized by the DC-DC converter 100, is supplied thereto.

A diode bridge B1 that full-wave rectifies the alternating-current voltage of the alternating-current input power supply Vac is provided in an input stage of the PFC converter 101. The diode bridge B1 corresponds to the "rectifying circuit" of a preferred embodiment of the present invention. In addition to a current-detection resistor Rcd, a series circuit including an inductor L1 and a switching element Q1 is connected to an output side of the diode bridge B1. A rectifying smoothing circuit including a diode D1 and a smoothing capacitor C1 is connected in parallel with the terminals of the switching element Q1. A boost chopper circuit includes the inductor L1, the switching element Q1, the diode D1 and the smoothing capacitor C1.

The current detection resistor Rcd and an input section of a digital signal processing circuit 13, to which a signal of the current detection resistor Rcd is input, correspond to the "current detector" of a preferred embodiment of the present invention.

An input voltage detection circuit 11 is provided between the terminals of the output side of the diode bridge B1. In addition, an output voltage detection circuit 12 is provided between the output terminals P21 and P22. The digital signal processing circuit 13 includes a DSP and controls the PFC converter 101 by digital signal processing. That is, the digital signal processing circuit 13 is input with an output signal of the input voltage detection circuit 11 in the form of a digital value and detects the value of the instantaneous voltage of the alternating-current input power supply. Furthermore, along with holding a digital value corresponding to the target value of the output voltage, being input with an output signal of the output voltage detection circuit 12 and detecting the output voltage, the digital signal processing circuit 13 also switches the switching element Q1 on and off at a predetermined switching frequency.

The digital signal processing circuit 13 corresponds to the "switching controller" of a preferred embodiment of the present invention. The input voltage detection circuit 11 and the input section of the digital signal processing circuit 13, which is input with a signal of the input voltage detection circuit 11, correspond to the "input voltage detector" of a preferred embodiment of the present invention. In addition, the output voltage detection circuit 12 and the input section of the digital signal processing circuit 13, which is input with a signal of the output voltage detection circuit 12, correspond to the "output voltage detector" of a preferred embodiment of the present invention.

Furthermore, the digital signal processing circuit 13 preferably includes a port to communicate with the DC-DC converter 100 which, for example, performs communication of data, is input with and outputs signals, continuously sends, for example, a state of the converter, sends the input voltage, the output voltage, the output current and other values to the DC-DC converter 100, and reflects a load state and other values received from the DC-DC converter 100 side in the switching control.

Figure 3A:
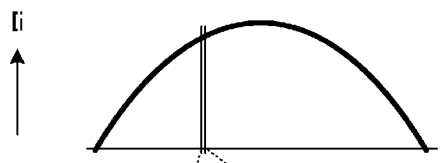
FIG. 3A to 3C are voltage and current waveform diagrams for a PFC converter for a unit switching period in a state in which control is performed in a continuous current mode.
Figure 3B:
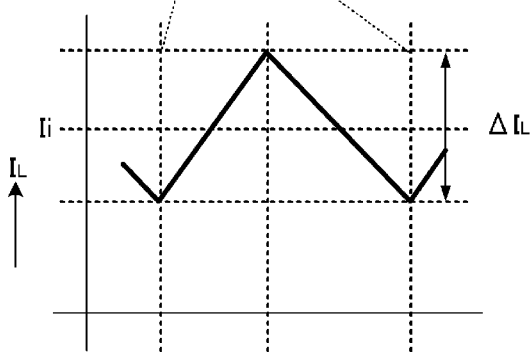
Figure 3C:
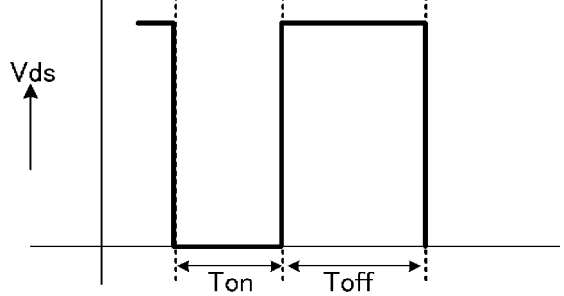

FIGS. 3A to 3C are voltage and current waveform diagrams for the PFC converter 101 for a unit switching period in a state in which control is performed in a continuous current mode.

The digital signal processing circuit 13 performs switching control such that the input current of the PFC converter 101, that is, the average value of a current flowing through the inductor L1, has a similar shape to a full wave rectified waveform. In this manner, harmonics are suppressed and the power factor is improved as a result of an input current that has a similar shape to the input voltage.

FIG. 3A is a current waveform of an average value Ii of a current flowing through the inductor L1 in a unit of half the period of the commercial power supply frequency, FIG. 3B is a waveform diagram of a current IL flowing through the inductor L1 in a unit switching period illustrated by enlarging a portion of the time axis, and FIG. 3C is a waveform diagram of the drain-source voltage Vds of the switching element Q1.

The current IL flows through the inductor L1 during the on period Ton of the switching element Q1 and the current IL increases with a gradient determined by the voltage between the terminals of the inductor L1 and the inductance of the inductor L1. Thereafter, during the off period Toff of the switching element Q1, the current IL decreases with a gradient determined by the voltage between the terminals of the inductor L1 and the inductance of the inductor L1. In this manner, the current IL flowing through the inductor L1 varies by the width of a current ripple $\Delta IL$ in the switching period.

Figure 4:
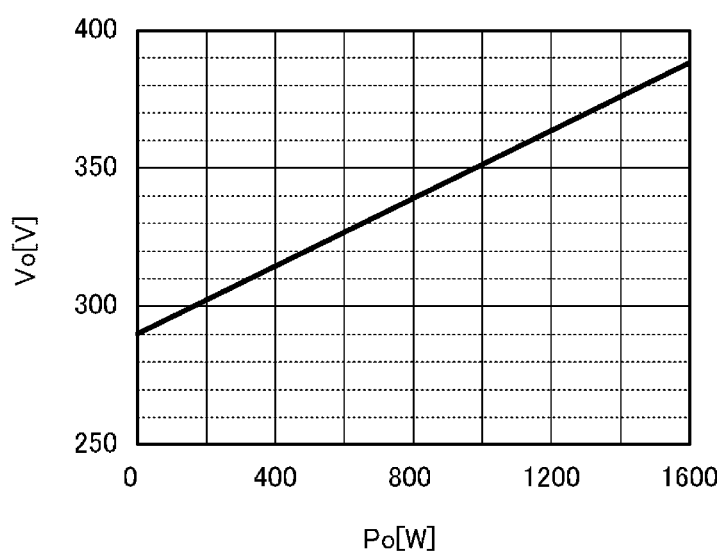
FIG. 4 is a diagram illustrating the relationship between a supply power Po supplied to a DC-DC converter and an output voltage Vo of the PFC converter.

FIG. 4 is a diagram illustrating the relationship between a supply power Po supplied to the DC-DC converter 100 and an output voltage Vo of the PFC converter 101.

For example, when the supply power Po supplied to the DC-DC converter 100 is zero, the output voltage Vo of the PFC converter is about 290 V and when the supply power Po supplied to the DC-DC converter 100 is about 1600 W, the output voltage Vo of the PFC converter is substantially about 390 V.

The minimum value of the output voltage of the PFC converter is determined so as to satisfy the following conditions.

(1) Higher than the peak value of the voltage input from the alternating-current input power supply in order to allow a boost operation at all input voltages.

(2) Supplies an energy of $E=CV^2/2$ for at least a predetermined period during an instantaneous power supply interruption.

(3) A voltage is output that is at least equal to the lowest voltage at which the downstream DC-DC converter can operate.

Considering (2), it is necessary that the output voltage be reduced when the load is light and that the output voltage be increased when the load is heavy. By varying the output voltage in accordance with the load, unnecessary boosting is prevented in a range from low to intermediate loads and therefore efficiency is improved.

A design example is described below.

Capacitance of capacitor C1: about 980 μF.

Minimum operating voltage of DC-DC converter 100: about 290 V

Instantaneous power interruption holding period: about 25 ms

Figure 5:
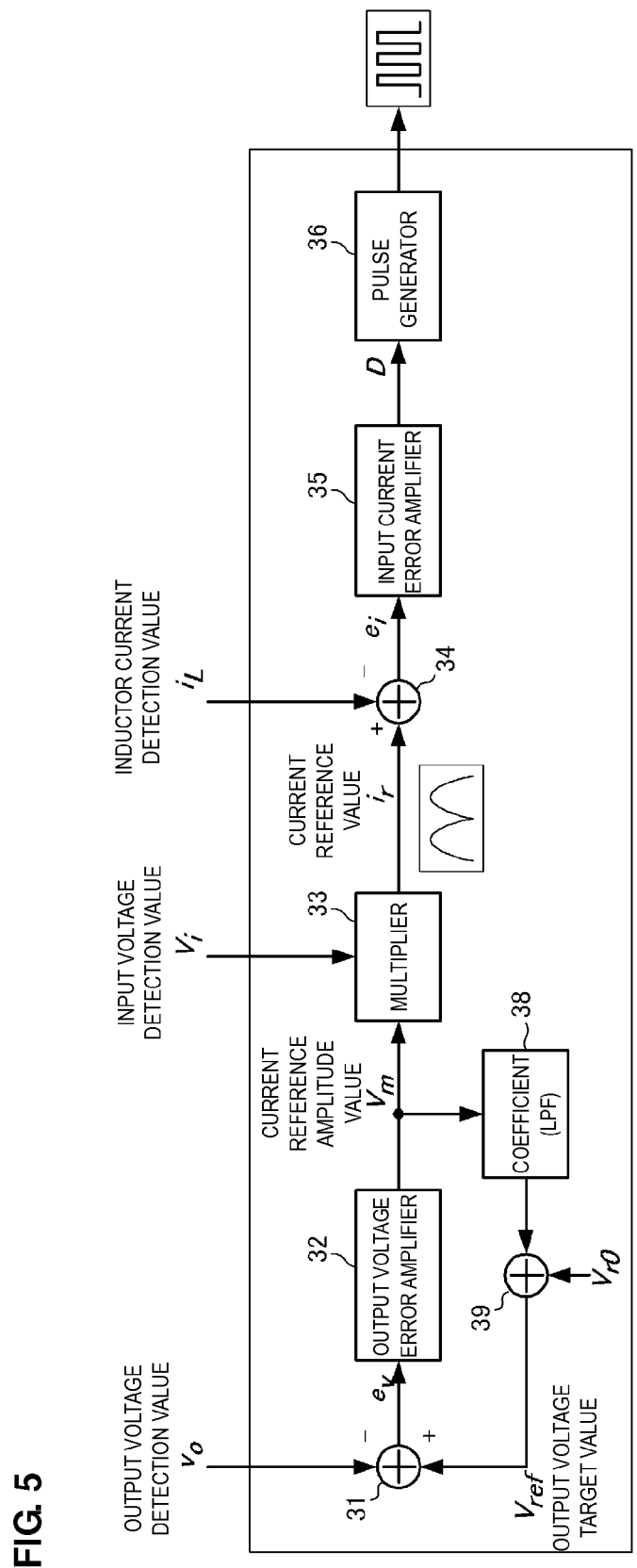
FIG. 5 is block diagram illustrating the content of processing performed by a digital signal processing circuit illustrated in FIG. 2.

FIG. 5 is a block diagram of the content of processing performed by the digital signal processing circuit 13 illustrated in FIG. 2.

In FIG. 5, preferably, an adder element 31 determines an error ev of an output voltage detection value vo with respect to an output voltage target value Vref to be described below. An output voltage error amplifier 32 determines a current reference amplitude value by multiplying a predetermined proportional coefficient by the error ev (Usually, it is necessary to ensure that the output voltage does not respond to ripples in the input voltage, and therefore an error amplifier for a PFC has a high cut characteristic). A multiplier 33 determines a current reference value ir by multiplying an input voltage detection value Vi by a current reference amplitude value Vm. An adder element 34 determines an input current error value ei, which is a difference between an inductor current detection value iL and the current reference value ir. An input current error amplifier 35 generates a modulation signal D for a pulse generator in accordance with the input current error value ei. A pulse generator 36 outputs a pulsed signal, which is a binary logic signal, based on the modulation signal D. The pulsed signal is a switching control signal for the switching element Q1. In other words, the switching control signal is preferably subjected to PWM modulation using a value based on the current error value ei. In this manner, the on period of the switching element Q1 is controlled.

A coefficient element 38 generates a value by multiplying a predetermined coefficient by the current reference amplitude value Vm, in other words generates a value that is proportional to the current reference amplitude value Vm. An adder element 39 determines an output voltage target value Vref by adding a value generated by the coefficient element 38 to a reference value vrO. The coefficient element 38 and the adder element 39 correspond to the "output voltage control value corrector" of a preferred embodiment of the present invention.

The coefficient element 38 changes the output voltage target value Vref in accordance with an output Vm of the output voltage error amplifier 32. Consequently, depending on the conditions, the output voltage target value Vref sometimes oscillates abnormally. For such a case, the coefficient element 38 is preferably configured to have a high cut characteristic. By doing this, the change in Vref occurs slowly and a transitory response is avoided even when the current reference amplitude value Vm changes suddenly.

In the example described above, an example was described in which the target value Vref of the output voltage is corrected preferably using a value that is proportional to the current reference amplitude value. However, the target of correction may instead be the output voltage error ev.

Figure 6A:
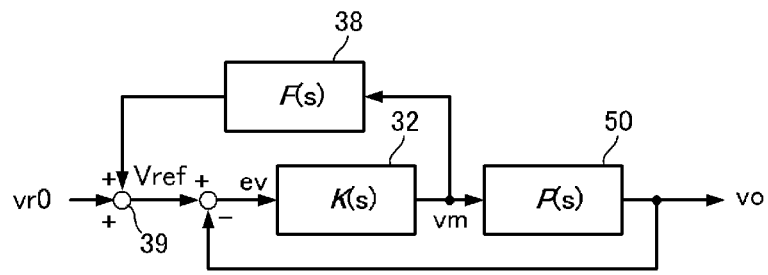
FIGS. 6A and 6B are block diagrams regarding output voltage feedback control.
Figure 6B:
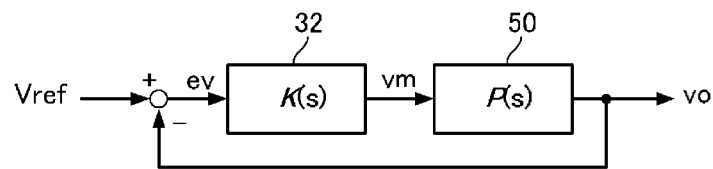

FIGS. 6A and 6B are block diagrams regarding output voltage feedback control. FIG. 6A is a block diagram of a feedback system based on the adder element 31, the output voltage error amplifier 32, the coefficient element 38 and the adder element 39 illustrated in FIG. 5. FIG. 6B illustrates a comparative example and is a block diagram for a case in which the coefficient element 38 and the adder element 39 are not provided in FIG. 5.

In the feedback system of the comparative example illustrated in FIG. 6B, the error ev of the output voltage detection value vo with respect to the output voltage target value Vref is determined, the output voltage error amplifier 32 outputs the current reference amplitude value Vm and a target of control (PFC converter) 50 controls the output voltage (output voltage detection value vo) based on the current reference amplitude value Vm.

However, in the feedback system illustrated in FIG. 6A, the output voltage target value Vref is preferably corrected again by adding a value, which was obtained by the coefficient element 38 multiplying a coefficient by the current reference amplitude value Vm, to the reference value vrO.

Figure 7:
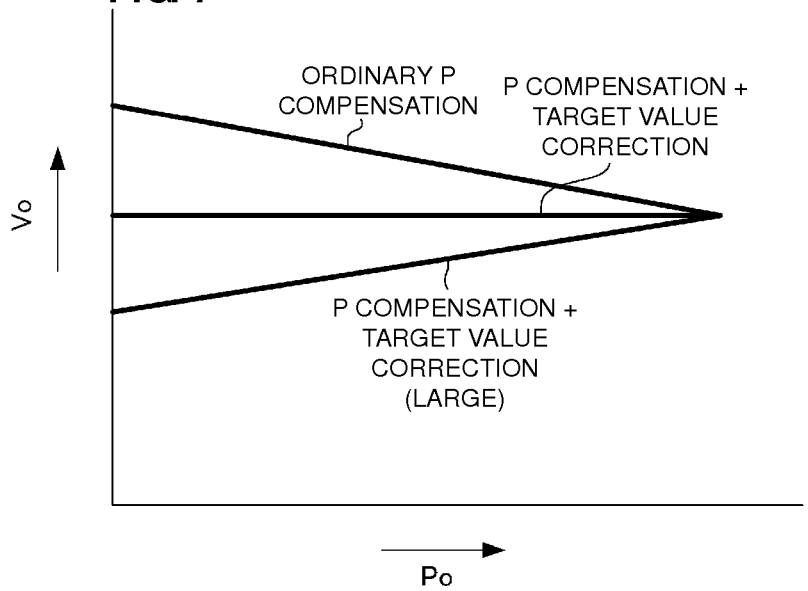
FIG. 7 is a diagram illustrating the relationship between load supply power and output voltage for the feedback systems illustrated in FIGS. 6A and 6B.

FIG. 7 is diagram illustrating the relationship between load supply power and output voltage for the feedback systems illustrated in FIGS. 6A and 6B.

In ordinary P control (P compensation) illustrated in FIG. 6B, the output voltage falls as the load becomes heavier, but the output voltage can be made constant using the control P compensation+target value correction) illustrated in FIG. 6A. However, in this preferred embodiment of the present invention, preferably, as the load becomes heavier (from a light load state to a heavy load state), the correction value of the target value of the output voltage is increased, and the output voltage is raised to a greater extent.

The output Vm of the output voltage error amplifier 32 is information regarding the current reference amplitude and, therefore, when the load increases Vm also increases. Therefore, the output voltage can be increased by correcting Vref in accordance with Vm.

In this manner, even when the load varies, the output voltage is suitably changed and the efficiency is improved.

As described above, the digital signal processing circuit 13 is defined by a DSP and, therefore, there is no effect from signal degradation, inclusion of noise, variation among elements and other factors, and highly accurate correction of the target value can be performed accordingly. Furthermore, complicated conditional determination and conditional branching can be performed with precision. For example, when the load is heavy, the target value is large. In this state, if the load is detected as suddenly becoming small, the output voltage target value Vref is reset to its initial value. Thus, the output voltage is prevented from jumping when the load suddenly becomes small.

Second Preferred Embodiment

Figure 8:
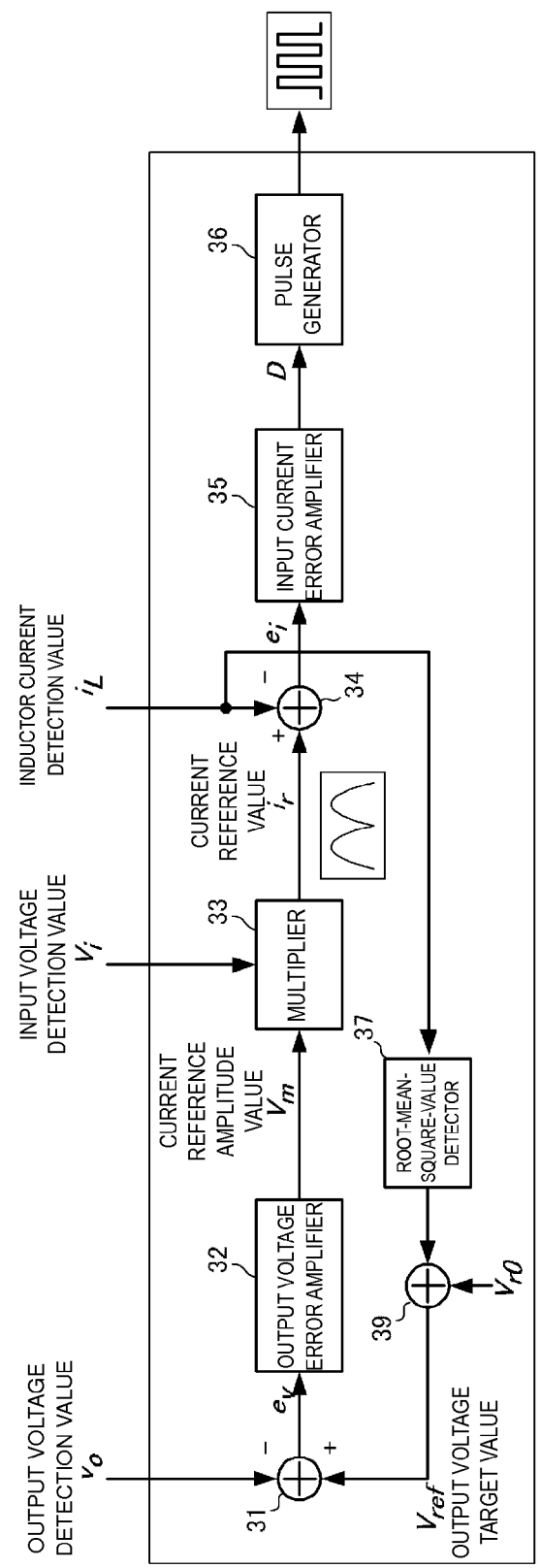
FIG. 8 is a block diagram illustrating the content of processing performed by a digital signal processing circuit (DSP) applied to a switching power supply apparatus according to a second preferred embodiment of the present invention.

FIG. 8 is a block diagram illustrating the content of processing performed by a digital signal processing circuit (DSP) applied to a switching power supply apparatus according to a second preferred embodiment of the present invention. The configuration of this switching power supply apparatus preferably is substantially the same as that illustrated in FIG. 2.

In FIG. 8, preferably, the adder element 31 determines the error ev of the output voltage detection value vo with respect to the output voltage target value Vref. The output voltage error amplifier 32 determines the current reference amplitude value Vm by multiplying a predetermined proportional coefficient by the error ev. The multiplier 33 determines the current reference value ir by multiplying the input voltage detection value Vi by the current reference amplitude value Vm. The adder element 34 determines the input current error value ei, which is the difference between the inductor current detection value iL and the current reference value ir. The input current error amplifier 35 generates a modulation signal D for a pulse generator in accordance with the input current error value ei. The pulse generator 36 outputs a pulsed signal on the basis of the modulation signal D.

A root-mean-square value detector 37 generates a value by multiplying a predetermined coefficient by the root-mean-square value or average value of the inductor current detection value iL. The adder element 39 determines the output voltage target value Vref by adding the value generated by the root-mean-square value detector 37 to the reference value vrO. The root-mean-square value detector 37 and the adder element 39 correspond to the "output voltage control value corrector" of a preferred embodiment of the present invention.

In this manner, the load supply power is detected based on the root-mean-square value or average value of the load supply current and when the load increases, the output voltage can be increased by correcting Vref in accordance with the increase in load.

By doing this, even when the load varies, the output voltage is suitably changed and the efficiency is improved.

In addition, similarly to the first preferred embodiment, rather than correcting the target value Vref of the output voltage by using a value that is proportional to the current reference amplitude value, the output voltage error ev is preferably corrected using a value that is proportional to the current reference amplitude value.

Third Preferred Embodiment

Figure 9A:
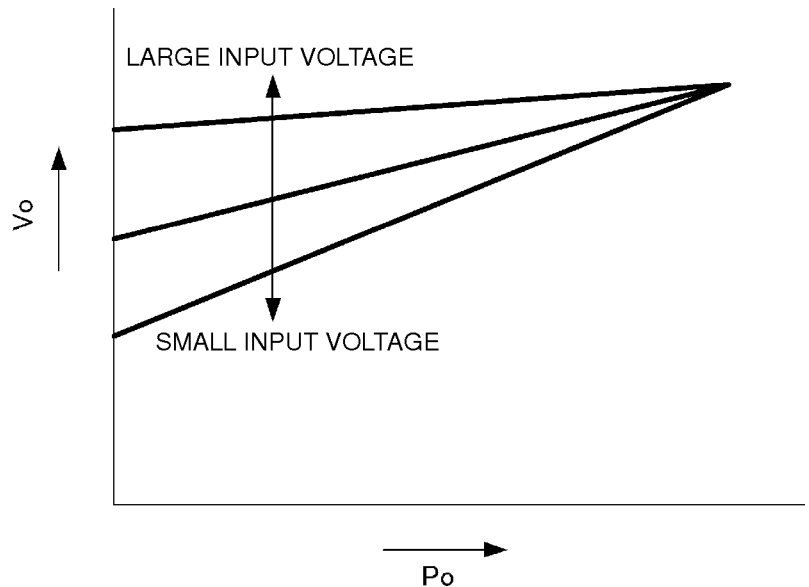
FIGS. 9A and 9B are diagrams illustrating the characteristics of the output voltage Vo with respect to the output power Po of the PFC converter included in a switching power supply apparatus according to a third preferred embodiment of the present invention taking the input voltage as a parameter.
Figure 9B:
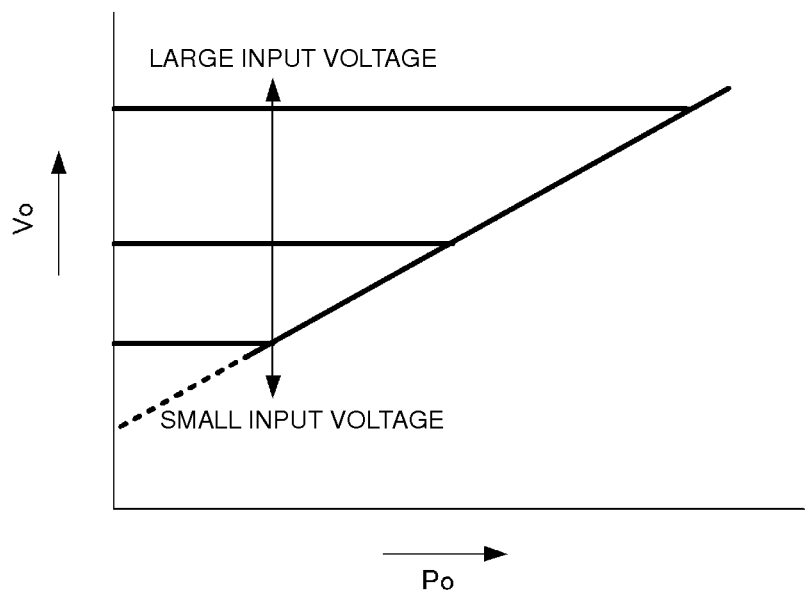

In contrast to the switching power supply apparatuses according to the first and second preferred embodiments, a switching power supply apparatus according to a third preferred embodiment of the present invention preferably takes the input voltage into consideration and changes an output voltage of a PFC converter in accordance with the input voltage. FIGS. 9A and 9B are diagrams illustrating the characteristics of the output voltage Vo with respect to the output power Po taking the input voltage as a parameter.

As has already been described, the output voltage of a PFC converter must be greater than the input voltage. Therefore, in order to satisfy this condition, the output voltage of the PFC converter is changed taking into account the input voltage preferably by using, for example, the following method.

As illustrated in FIG. 9A, the gradient and intercept of the output voltage Vo with respect to the output power Po are changed in accordance with the input voltage.

Furthermore, as illustrated in FIG. 9B, a lower limit is set for the output voltage. In other words, a region in which the output voltage is fixed with respect to variations in the load and a region in which the output voltage varies with respect to variations in the load are preferably provided.

By doing this, the power conversion efficiency of the DC-DC converter is optimized in accordance with the state of the load while maintaining the output voltage of the PFC converter so as to be greater than the input voltage and as a result the power conversion efficiency of the AC-DC converter as a whole is increased.

Fourth Preferred Embodiment

In the switching power supply apparatus according to the first preferred embodiment illustrated in FIG. 2, switching control is performed preferably using the digital signal processing circuit 13, which is based on a DSP, whereas a fourth preferred embodiment of the present invention is an example in which the output voltage error amplifier 32 illustrated in FIG. 5 is preferably defined by an analog element.

Figure 10:
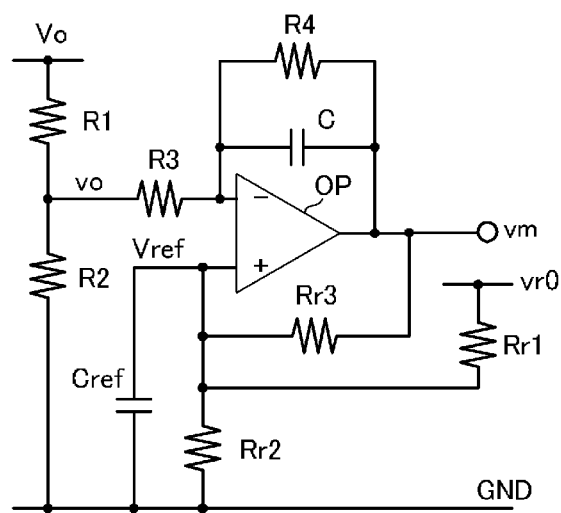
FIG. 10 is a circuit diagram of an output voltage error amplifier according to a fourth preferred embodiment of the present invention.

FIG. 10 is a circuit diagram of an output voltage error amplifier according to the fourth preferred embodiment. An input voltage Vref of a non-reversed input terminal (+) of an operational amplifier OP is expressed by the following equation (1). Here, Vm is the output voltage (output of output voltage error amplifier) of the operational amplifier OP, Vo is the output voltage detection value and Vref is the output voltage target value.

$$Vref=(VrO/Rr1+Vm/Rr3)/(1/Rr1+1/Rr2+1/Rr3) \quad (1)$$

Furthermore, a capacitor Cref is preferably connected in parallel with a resistor Rr2 and therefore as the capacitance of the capacitor Cref increases, the change in the output voltage target value Vref becomes per unit time is decreased. That is, the function of a low-pass filter is provided.

Fifth Preferred Embodiment

Figure 11:
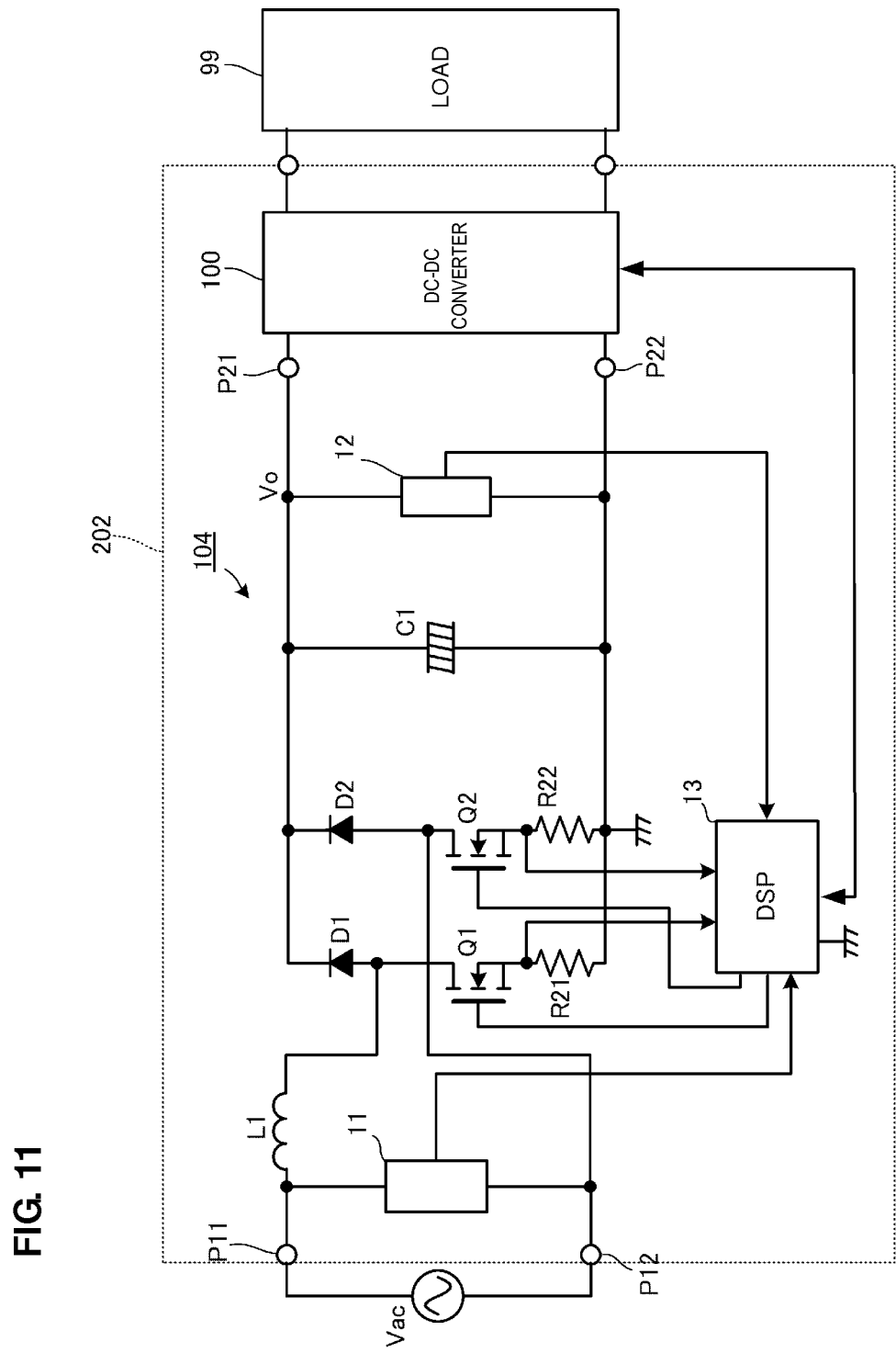
FIG. 11 is a circuit diagram of a switching power supply apparatus 202 according to a fifth preferred embodiment of the present invention.

FIG. 11 is a circuit diagram of a switching power supply apparatus 202 according to a fifth preferred embodiment of the present invention. In addition, FIGS. 12A to 12D are diagrams illustrating current paths at four timings in a PFC converter 104.

The PFC converter 104 illustrated in FIG. 11 is a diode-bridge-less PFC converter preferably including two inductors and two switching elements, with no diode bridge therebetween.

In FIG. 11, symbols P11 and P12 denote input terminals of the PFC converter 104 and symbols P21 and P22 denote output terminals of the PFC converter 104. An alternating-current input power supply Vac, which is a commercial alternating-current power supply, is input to the input terminals P11 and P12 and a DC-DC converter 100 is connected to the output terminals P21 and P22.

A load 99 is connected to the output of the DC-DC converter 100 and a direct-current voltage stabilized by the DC-DC converter 100 is supplied thereto.

Preferably, an input voltage detection circuit 11 is provided in an input stage of the PFC converter 104 and an inductor L1 is connected in series therewith on a single line. A bridge circuit based on diodes D1 and D2 and switching elements Q1 and Q2 is connected next to the inductor L1. Current detection resistors R21 and R22 are connected between the sources and grounds of the switching elements Q1 and Q2. A smoothing circuit including a smoothing capacitor C1 is connected in parallel with the output of the bridge circuit.

Figure 12A:
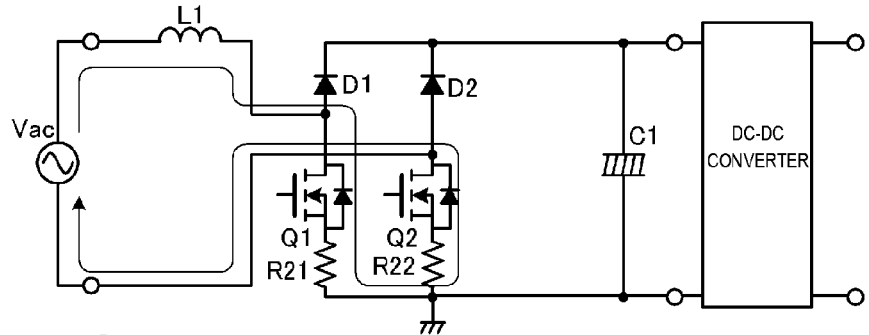
FIGS. 12A to 12D are diagrams illustrating current paths at four timings in a PFC converter 104 illustrated in FIG. 11.
Figure 12B:
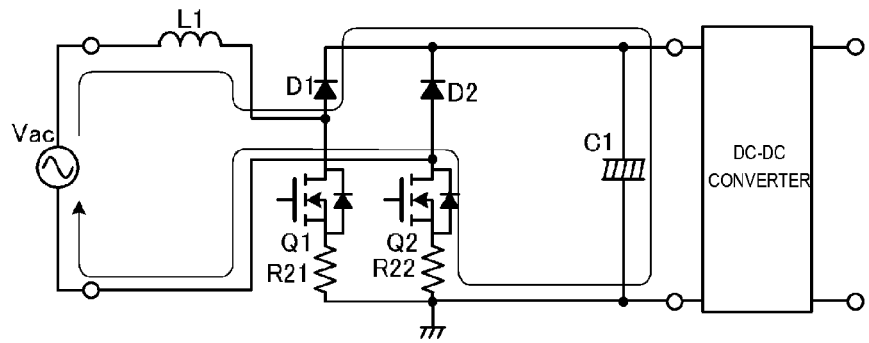

FIG. 12A illustrates a current path for the positive half of the cycle of alternating-current input power supply when the switching elements Q1 and Q2 are both in an on state and FIG. 12B illustrates a current path for the positive half of the cycle of alternating-current input power supply when the switching elements Q1 and Q2 are both in an off state.

Figure 12C:
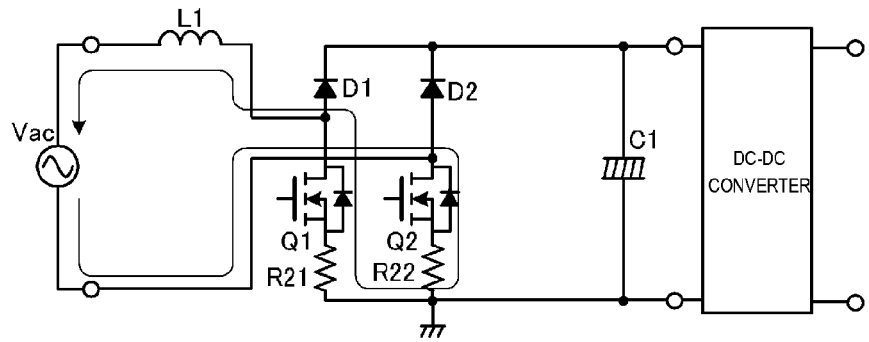
Figure 12D:
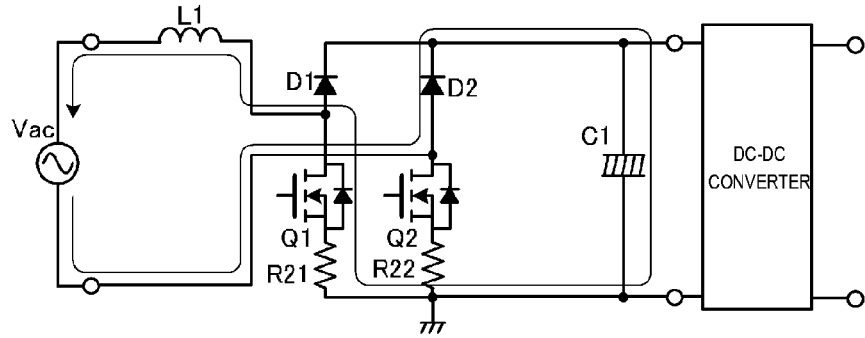

In addition, FIG. 12C illustrates a current path for the negative half of the cycle of the alternating-current input power supply when the switching elements Q1 and Q2 are both in an on state and FIG. 12D illustrates a current path for the negative half of the cycle of alternating-current input power supply when the switching elements Q1 and Q2 are both in an off state.

In the positive half of the cycle of the alternating-current input power supply, when Q1 and Q2 are in an on state, a current flows along the path illustrated in FIG. 12A and excitation energy accumulates in the inductor L1 and when Q1 and Q2 are in an off state a current flows along the path illustrated in FIG. 12B and the excitation energy is discharged from the inductor L1. At this time, a current flows through a parasitic diode of Q2. Similarly, in the negative half of the cycle of the alternating-current input power supply, when Q1 and Q2 are in an on state, a current flows along the path illustrated in FIG. 12C and excitation energy accumulates in the inductor L1, and when Q1 and Q2 are in an off state the excitation energy is discharged from the inductor L1 at the timing illustrated in FIG. 12D. At this time, a current flows through a parasitic diode of Q1.

A current detection resistor R21 is preferably provided in order to detect the current flowing through the inductor L1 in the on period of Q1 in the positive half of the cycle of the alternating-current input power supply. In addition, a current detection resistor R22 is preferably provided in order to detect the current flowing through the inductor L1 in the on period of Q2 in the negative half of the cycle of the alternating-current input power supply. The digital signal processing circuit 13 illustrated in FIG. 11 detects an average value of the current flowing through the inductor L1 by sampling the falling voltages of the current detection resistors R21 and R22 in the middle of the on periods of the switching elements Q1 and Q2.

In the case in which average current control is performed in a continuous current mode, the digital signal processing circuit 13 illustrated in FIG. 11 preferably takes the product of the output voltage error, which is the error of the detection value of the output voltage with respect to the target value of the output voltage, and the detection value of the input voltage as the current reference amplitude value and controls the on periods of the switching elements Q1 and Q2 in accordance with the difference between this current reference amplitude value and the currents flowing through the switching elements Q1 and Q2. Then, the target value of the output voltage or the output voltage error is corrected using a value that is proportional to the current reference amplitude value such that the output voltage rises as the load goes from a light load state to a heavy load state.

Furthermore, in the case in which peak current control is performed in a critical mode, the digital signal processing circuit 13 illustrated in FIG. 11 preferably takes the product of the output voltage error, which is the error of the detection value of the output voltage with respect to the target value of the output voltage, and the detection value of the input voltage as the current reference amplitude value and switches the switching element Q1 or Q2 off when the current flowing through the switching element Q1 or Q2 has reached the current reference amplitude value. Then, the target value of the output voltage or the output voltage error is corrected using a value that is proportional to the current reference amplitude value such that the output voltage rises, as the load goes from a light load state to a heavy load state.

Sixth Preferred Embodiment

Figure 13:
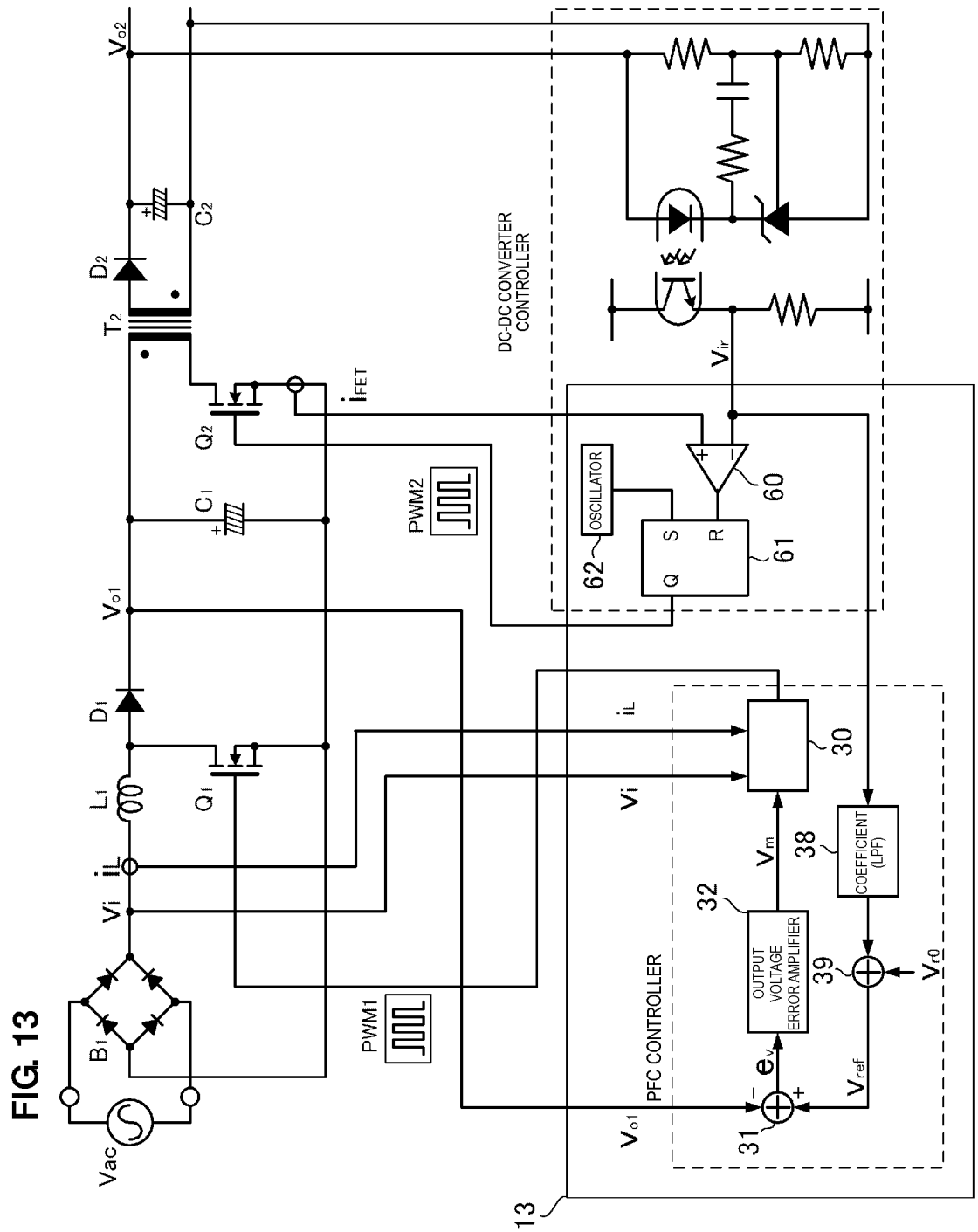
FIG. 13 is a circuit diagram of a switching power supply apparatus 203 according to a sixth preferred embodiment of the present invention.

FIG. 13 is a circuit diagram of a switching power supply apparatus 203 according to a sixth preferred embodiment of the present invention. Furthermore, FIG. 14 shows voltage and current waveform diagrams of individual components of FIG. 13.

In the examples illustrated in FIGS. 2 and 11, the output voltage Vo output to the DC-DC converter 100 is detected by the output voltage detection circuit 12, whereas in the case in which a voltage converter, such as a DC-DC converter, is connected to the output of a PFC converter, the output voltage of the DC-DC converter can be detected and used to control the PFC converter. The sixth preferred embodiment is an example of such a case. In FIG. 13, a PFC converter preferably includes a diode bridge B1, an inductor L1, a diode D1, a switching element Q1 and a smoothing capacitor C1. This configuration is similar to that of the first preferred embodiment illustrated in FIG. 2. In addition, in FIG. 13, illustration of the configurations of the current detection resistor Rcd and the input voltage detection circuit 11 as shown in FIG. 2 is omitted.

A switching power supply apparatus 203 preferably includes a DC-DC converter that includes a transformer T2, the switching element Q2, a rectifying diode D2, and a smoothing capacitor C2.

In FIG. 13, a digital signal processing circuit 13 preferably includes a DSP and in this example, the content of operations thereof is represented using an equivalent circuit. That is, the PFC controller has substantially the same configuration as that of the first preferred embodiment illustrated in FIG. 5. In addition, a portion of the circuit that is input with the current reference amplitude value Vm, which is the output value of an output voltage error amplifier 32, and that outputs a PWM signal (PWM1) for the switching element Q1, is represented in a simplified manner as a single block 30.

In the digital signal processing circuit 13, a DC-DC converter controller preferably includes an output voltage detection circuit that generates a detection voltage Vir that changes in accordance with the output voltage vo2 of the DC-DC converter. In addition, the DC-DC converter controller preferably includes a comparator 60 that compares the detection voltage Vir and a voltage that is proportional to a current iFET flowing through the switching element Q2, and a flip flop 61 that is reset by the output of the comparator 60 and is set by the output of an oscillator 62.

As illustrated in FIG. 14, when the output of an oscillator 62 becomes a high level, PWM2 rises and when the current value of the current iFET flowing through the switching element Q2 of the DC-DC converter has exceeded the output voltage detection value Vir, the output signal PWM2 of the flip flop 61 falls.

The output voltage detection value Vir becomes high when the output power of the DC-DC converter becomes high.

In the PFC controller, a coefficient element 38 generates a value by multiplying a predetermined coefficient by the output voltage detection value Vir. An adder element 39 determines the output voltage target value Vref by adding the value generated by the coefficient element 38 to the reference value VrO. Operations thereafter are substantially the same as those of the circuits illustrated in FIGS. 5 and 8.

In this manner, it is ensured that the output voltage of the PFC converter is changed based on the output voltage detection value of the DC-DC converter that operates in response to being input with the output voltage of the PFC converter.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a power factor correction converter including a rectifying circuit arranged to rectify an alternating-current voltage input from an alternating-current input power supply, a series circuit connected next to the rectifying circuit and including an inductor and a switching element, a rectifying smoothing circuit connected in parallel with the switching element, and a switching controller arranged to control the switching element such that an input current input from the alternating-current input power supply has a similar shape to the alternating-current voltage;
   an isolated DC-DC converter connected next to the power factor correction converter and including a transformer that includes at least a primary coil and a second coil, a primary-side circuit that is connected to the primary coil, and a second-side circuit that is connected to the second coil and outputs a power supply voltage to a load;
   an input voltage detector arranged to detect an input voltage input from the alternating-current input power supply;
   a current detector arranged to detect a current flowing through the inductor or a current flowing through the switching element; and
   an output voltage detector arranged to detect an output voltage of the rectifying smoothing circuit; wherein
   the switching controller takes a product of an output voltage error, which is an error of a detection value of the output voltage with respect to a target value of the output voltage, and a detection value of the input voltage as a current reference amplitude value and controls an on period of the switching element in accordance with a difference between the current reference amplitude value and the current detected by the current detector; and
   the switching power supply apparatus further comprises an output voltage control value corrector arranged to correct the target value of the output voltage or the output voltage error by using a value that is proportional to the current reference amplitude value such that the output voltage rises as the load goes from a light load state to a heavy load state.

2. The switching power supply apparatus according to claim 1, wherein the switching controller and the output voltage control value corrector are defined by a digital signal processor that holds a digital value that corresponds to the target value of the output voltage; and the output voltage control value corrector corrects the digital value by using the value that is proportional to the current reference amplitude value.

3. A switching power supply apparatus comprising:

a power factor correction converter including a rectifying circuit arranged to rectify an alternating-current voltage input from an alternating-current input power supply, a series circuit connected next to the rectifying circuit and including an inductor and a switching element, a rectifying smoothing circuit connected in parallel with the switching element, and a switching controller arranged to control the switching element such that an input current input from the alternating-current input power supply has a similar shape to the alternating-current voltage;

an isolated DC-DC converter connected next to the power factor correction converter and including a transformer that includes at least a primary coil and a second coil, a primary-side circuit connected to the primary coil, and a second-side circuit connected to the second coil and outputs a power supply voltage to a load;

an input voltage detector arranged to detect an input voltage input from the alternating-current input power supply;

a current detector arranged to detect a current flowing through the inductor or a current flowing through the switching element; and an output voltage detector arranged to detect an output voltage of the rectifying smoothing circuit; wherein the switching controller takes a product of an output voltage error, which is an error of a detection value of the output voltage with respect to a target value of the output voltage, and a detection value of the input voltage as a current reference amplitude value and switches the switching element off when the current detected by the current detector has reached the current reference amplitude value; and the switching power supply apparatus further comprises an output voltage control value corrector arranged to correct the target value of the output voltage or the output voltage error by using a root-mean-square value or an average value of the current detected by the current detector and a value that is proportional to the current reference amplitude value such that the output voltage rises as the load goes from a light load state to a heavy load state.

4. The switching power supply apparatus according to claim 3, wherein the switching controller and the output voltage control value corrector are defined by a digital signal processor that holds a digital value that corresponds to the target value of the output voltage; and the output voltage control value corrector corrects the digital value by using the value that is proportional to the current reference amplitude value.

* * * * *